(12) United States Patent
Kitahara

(10) Patent No.: US 7,207,052 B2
(45) Date of Patent: Apr. 17, 2007

(54) RECORDING MEDIUM CARTRIDGE AND RECORDING AND REPRODUCING DEVICE

(75) Inventor: Toshiyuki Kitahara, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 326 days.

(21) Appl. No.: 10/644,758

(22) Filed: Aug. 21, 2003

(65) Prior Publication Data

US 2004/0037004 A1    Feb. 26, 2004

(30) Foreign Application Priority Data

Aug. 26, 2002   (JP)   ............... 2002-245068

(51) Int. Cl.
*G11B 15/18*   (2006.01)

(52) U.S. Cl. ..................................... 720/725

(58) Field of Classification Search ................. 369/291
See application file for complete search history.

(56) References Cited

U.S. PATENT DOCUMENTS

| | | | |
|---|---|---|---|
| 5,852,534 A * | 12/1998 | Ozue et al. ................. 360/69 |
| 5,926,607 A * | 7/1999 | Oguro et al. ................. 386/95 |
| 6,088,182 A * | 7/2000 | Taki et al. ................... 360/71 |
| 6,674,596 B1 * | 1/2004 | Takayama .................... 360/69 |
| 2003/0067701 A1 | 4/2003 | Christie, Jr. |
| 2003/0090829 A1 * | 5/2003 | Johnson et al. ............... 360/69 |

OTHER PUBLICATIONS

Patent Abstracts of Japan abstracting JP 2001-332064 published Nov. 30, 2001.

* cited by examiner

*Primary Examiner*—Hoa T. Nguyen
*Assistant Examiner*—Mark Blouin
(74) *Attorney, Agent, or Firm*—Sughrue Mion, PLLC

(57) ABSTRACT

To provide a recording-medium cartridge and a recording-and-reproducing device in which a write-once area and a re-writable area can exist together. By controlling recording-and-reproducing device 11 based on the information showing the re-writable area and the write-once area stored in management information of cartridge memory 9 and by recording on the magnetic tape MT, co-existence of the re-writable area and the write-once area on the magnetic tape MT is achieved.

15 Claims, 9 Drawing Sheets

FIG.2
(a)
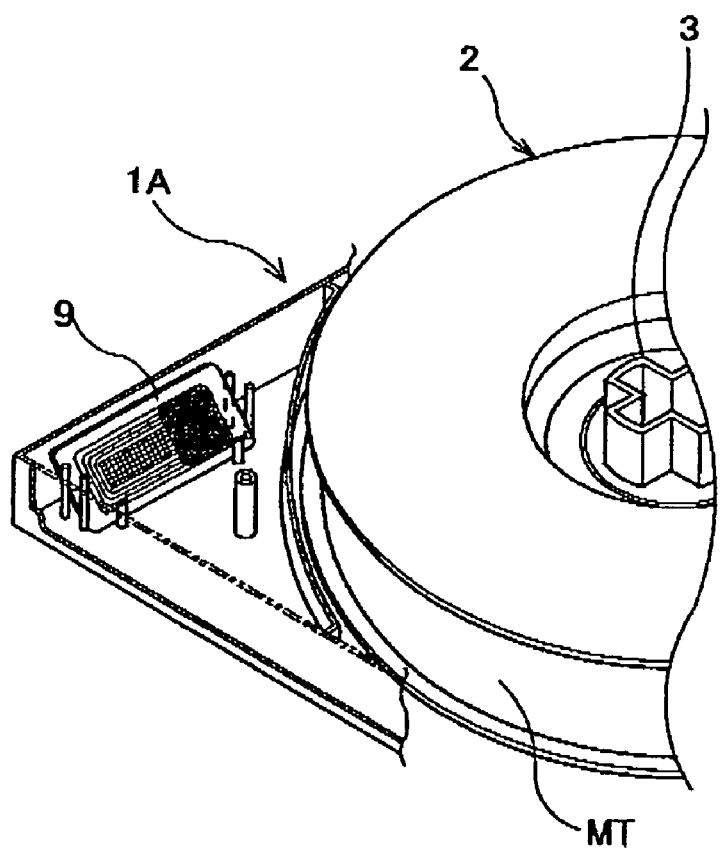
(b)
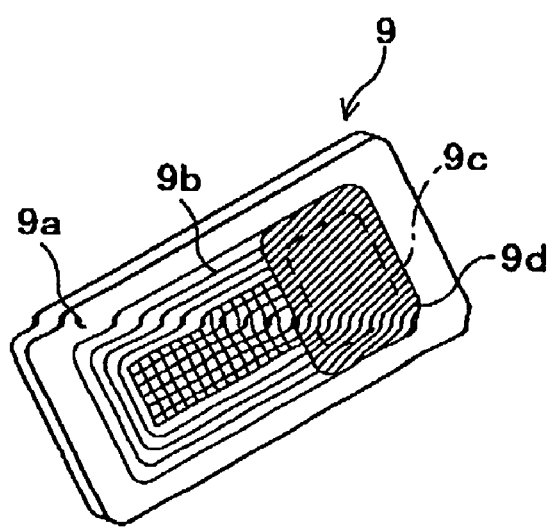

(a)

(b)

RECORDING MEDIUM CARTRIDGE AND RECORDING AND REPRODUCING DEVICE

BACKGROUND OF THE INVENTION

1. Field of the Invention

The present invention relates to a cartridge of a recording-medium cartridge (hereinafter indicated as recording-medium cartridge) equipped with a cartridge memory. Additionally, the present invention relates to a recording-and-reproducing device of the recording-medium cartridge.

2. Description of Relevant Art

A conventional recording-medium cartridge, which stores a recording-medium, such as a magnetic tape, is equipped with a cartridge memory. This cartridge memory mainly holds manufacturing-information, which is the information with regard to a manufacturer and to a serial (production) number, and history information, which is the information with regard to a user name and to used hours. In this recording-medium cartridge equipped with a cartridge memory, the data-exchange and the power supply of the cartridge memory is performed in a contactless manner. To be more precise, the data-exchange between the cartridge memory and an external device and the power supply to the cartridge memory are performed in a contactless manner by utilizing an electromagnetic induction. Therefore, the cartridge memory is stored in the cartridge case. As an example of these kinds of the recording-medium cartridge, the recording-medium cartridge disclosed in Japanese unexamined patent application (JP2001-332064) can be cited.

In the conventional recording-medium cartridge, basically, the recording (re-write) of the data on a media is allowed to perform repeatedly.

The recording-medium cartridge, which adopts the mechanism that forbids the re-write of the information on the media, has also been discovered. In this mechanism, the forbiddance of the re-write of the information is determined by recognizing the change of the shape of the recording-medium. To be more precise, a breakable tab, which is provided on the side of the recording-medium cartridge, is used as this mechanism. In the recording-medium cartridge adopting this mechanism, the re-write of the information is forbidden, when a recording-and-reproducing device detects the presence of the opening, which is formed by breaking the breakable tab.

In the conventional recording-medium cartridge adopting this mechanism, however, the re-write of the information is forbidden in the whole area of the media. That is, in the conventional recording-medium cartridge, a write-once area and a re-writable area cannot exist simultaneously on the media. Here, the write-once area is the area wherein the re-write of the data is forbidden, and the re-writable area is the area wherein the re-write of the data is allowed.

Therefore, the recording-medium cartridge, which stores the media that has both the write-once area and the re-writable area, has been required. Additionally, the recording-and-reproducing device of this recording-medium cartridge has also been required.

SUMMARY OF THE INVENTION

The present invention relates to a recording-medium cartridge that includes a recording medium and a cartridge memory. In this recording-medium cartridge, the recording medium includes a write-once area, in which the re-write of data is forbidden, and a re-writable area, in which the re-write of data is allowed. The cartridge memory holds range information that shows the range of the write-once area on the recording medium.

In this recording-medium cartridge the distinction between the write-once area and the re-writable area can be performed, by checking the range information held in the cartridge memory. Thereby, the recording-medium can adopt the recording-medium that has both the write-once area and the re-writable area.

In addition, the write-once area (write-once: WORM=Write Once Read Many times) is the area that permits writing only once and prevents rewriting and elimination. The re-writable area (RW=Read Write) is the area that is recordable again on the portion that recorded information once.

BRIEF DESCRIPTION OF THE INVENTION

FIG. 2A is a perspective view showing a state in which the cartridge memory is attached to the lower half of the cartridge case.

FIG. 2B is a perspective view of the cartridge memory.

PREFERRED EMBODIMENT OF THE INVENTION

Preferred embodiments of a recording-medium cartridge according to the present invention and a recording-and-reproducing device of the recording-medium cartridge will be explained referring to the attached drawings. In the following explanation, a magnetic tape cartridge is used as the recording-medium cartridge.

[Magnetic Tape Cartridge]

First, the composition of the magnetic tape cartridge according to the present embodiment will be explained, referring to FIG. 1 and FIG. 2.

Figure 1:
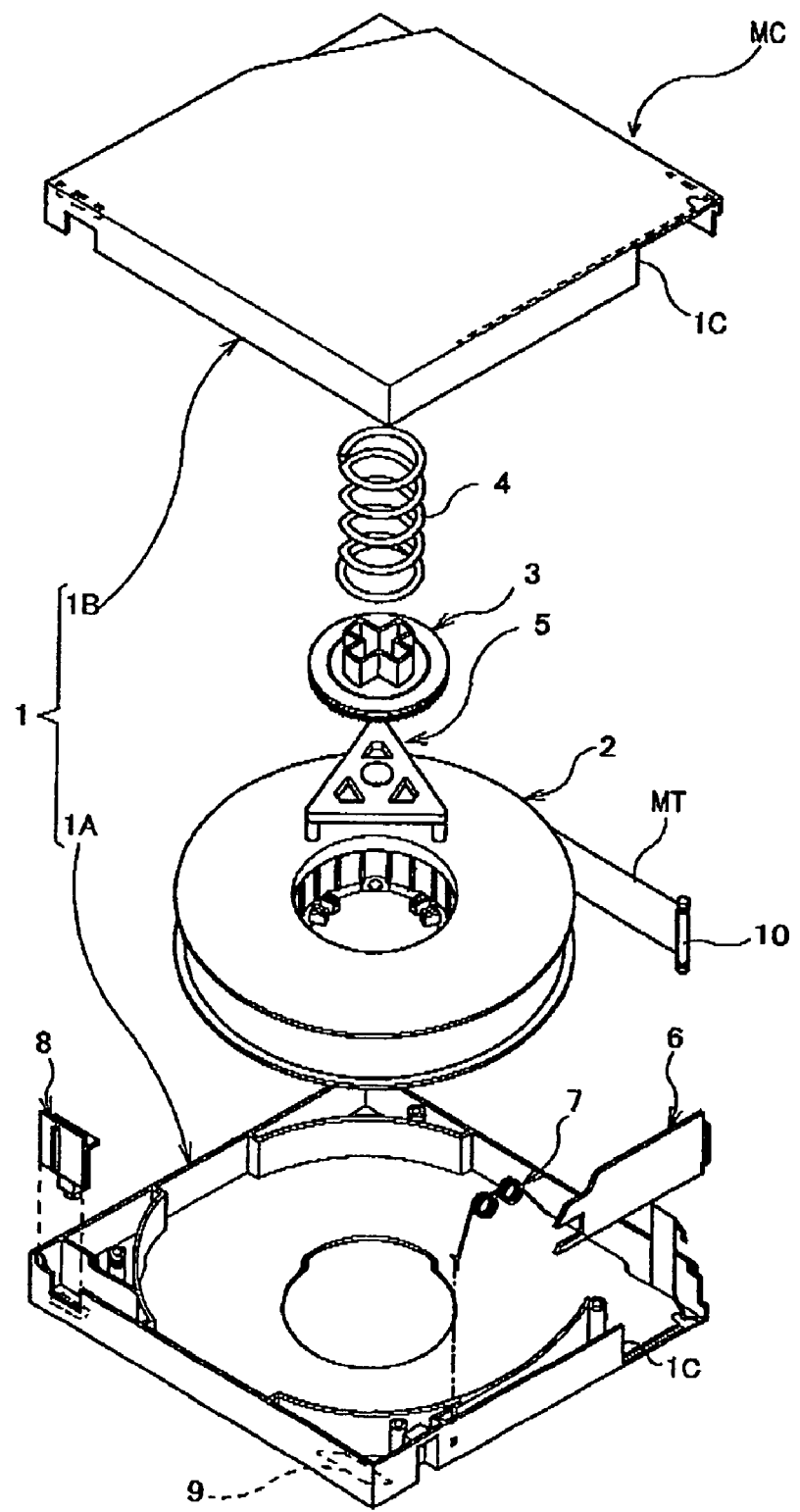
FIG. 1 is an exploded perspective view of the magnetic tape cartridge according to the present invention.

As shown in FIG. 1, a cartridge case 1 of a magnetic tape cartridge MC is composed of a lower-half 1A and an upper-half 1B, which are put together into a single piece. This magnetic tape cartridge MC includes a cartridge case 1, a reel 2, a lock plate 3, a compression coil spring 4, a release pad 5, a slide door 6, a coil spring 7, an erroneous deletion prevention pawl 8, a cartridge memory 9, and a leader pin 10, etc.

In this magnetic tape cartridge MC, a magnetic tape MT serves as a media is being wound around the reel 2 and is stored in the cartridge case 1. The leader pin 10 is pulled when drawing out the magnetic tape MT from the cartridge case 11 The lock plate 3 and the compression coil spring 4 are used for preventing the rotation of the reel 2 by locking the reel 2. The release pad 5 is provided in order to allow the rotation of the reel 2 by releasing the lock of the reel 2. The slide door 6 is provided in order to shut and open the opening which is formed when the upper-half 1B and the lower-half 1A are put together. The coil spring 7 pushes the slide door 6 in order to close the opening by the slide door 6.

In this cartridge case 1, additionally, the position where the cartridge memory 9 is provided is in a corner of lower-half 1A so that the traveling of the magnetic tape MT may not be disturbed by the cartridge memory 9 (FIG. 2A).

As shown in FIG. 2B, the cartridge memory 9 is composed of a base plate 9*a*, a loop antenna 9*b*, an IC-tip 9*c*, and a globe top 9*d*. The base plate 9*a* has a shape of thin rectangular plate, and is made of resin materials. A loop antenna 9*b* and the IC-tip 9*c* are provided on the base plate 9*a*. In this cartridge memory 9, the IC-tip 9*c* is enclosed in a globe top 9*d* made of plastic sealant. The IC-tip 9*c* is connected to a loop antenna 9*b* printed on a base plate 9*a*. In the cartridge memory 9, the exchange of the data between the IC-tip 9*c* and an external device is performed by spreading an electromagnetic wave onto the loop antenna 9*b* from outside of the magnetic tape cartridge MC.

In the cartridge memory 9, moreover, the power that drives IC-tip 9*c* is also supplied from the outside of the magnetic tape cartridge MC by spreading the electromagnetic wave.

The IC-tip 9*c* of the cartridge memory 9 holds manufacturing-information and management information, Here, manufacturing-information is the information with regard to a manufacturer and to a serial (production) number. Management information is the information with regard to a user name and to used hours.

Figure 3:
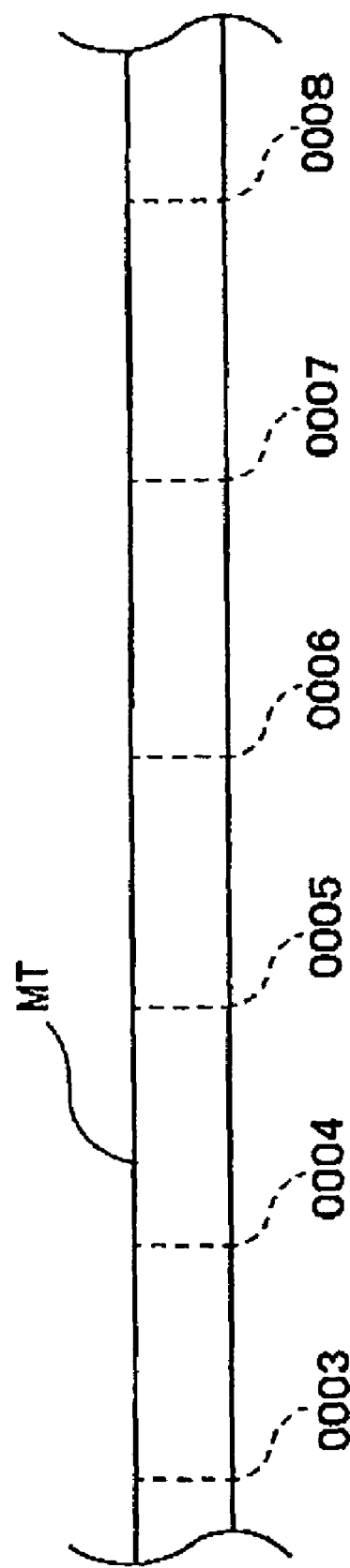
FIG. 3 is an explanatory view indicating the relation between the magnetic tape and the address code.

As shown in FIG. 3, in the present embodiment, the recording area of the magnetic tape MT is divided into a plurality of sections along its length (traveling) directions at regular intervals. Each boundary between sections has a unique identification number (address code).

Figure 4:
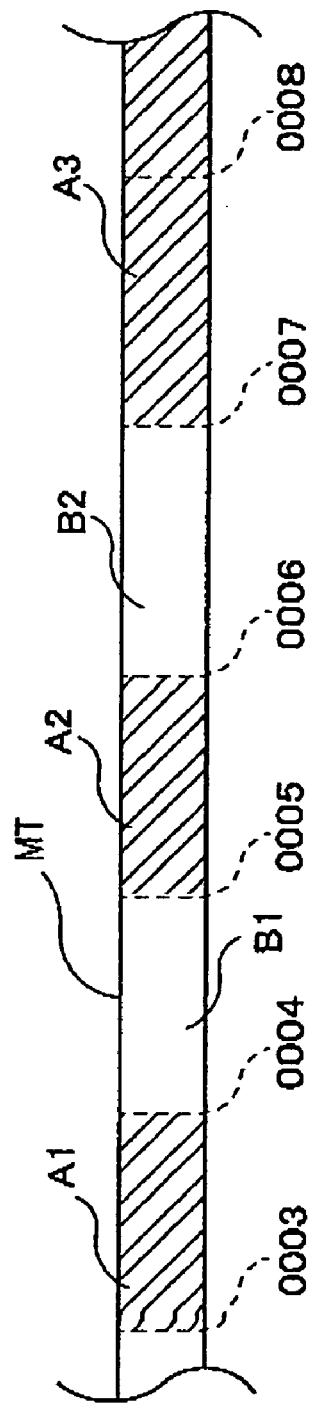
FIG. 4A is a table showing the relation between the address code and the information code
FIG. 4B is an explanatory view indicating the relation between the write-once region and the re-writable region on the magnetic tape.

As shown in FIG. 4A, the information held in the cartridge memory 9 also includes identification information that indicate whether the region behind the boundary having a specific unique identification number (address code) is the re-writable area or the write-once area. In the present embodiment, the identification information is set to "1", if the section behind the boundary is the write-once area. On the other hand, the identification information is set to "0", if the section behind the boundary is the re-writable area.

In the present invention, therefore, the distinction between the re-writable area and the write-once area can be performed by utilizing the identification information held in the cartridge memory 9. In other words, the distinction of whether the region between the boundary (point) having a certain address code and the boundary (point) having a following address code is re-writable area or a write-once area can be performed by the identification information.

In the present embodiment, as described above, the distinction of whether the specific region of the magnetic tape MT is the re-writable area or the write-once area can be performed. Thus, the re-write of the data on the magnetic tape to MT can be controllable.

For example, in the case of the area behind the point whose address code is 0003, since the identification information is "0", this area is the re-writable area. Additionally, in the case of the area behind the point whose address code is 0004, since the identification information is "1", this area is the write-once area. Thereby, the region between the point whose address code is 0003 and the point whose address code is 0004 is the re-writable area A1. Thus, the recording-and-reproducing device 11 records the data on this region.

In the case of the area behind the point whose address code is 0004, since the identification information is "1", this area is the write-once area. Additionally, in the case of the area behind the point whose address code is 0005, since the identification information is "0", this area is the re-writable area. Thereby, the region between the point whose address code is 0004 and the point whose address code is 0005 is the write-once area B1. Thus, the recording-and-reproducing device 11 can not perform the re-write of the data on this region.

Similarly, the region between the point whose address code is 0005 and the point whose address code is 0006 is the re-writable area A2. The region between the point whose address code is 0006 and the point whose address code is 0007 is the write-once area B2. Additionally, the region from the point whose address code is 0007 to the point whose identification information is "1" serves as the re-writable area A3.

[Recording-and-Reproducing Device]

Next, the explanation with regard to a recording-and-reproducing device 11 will be carried out.

Figure 5:
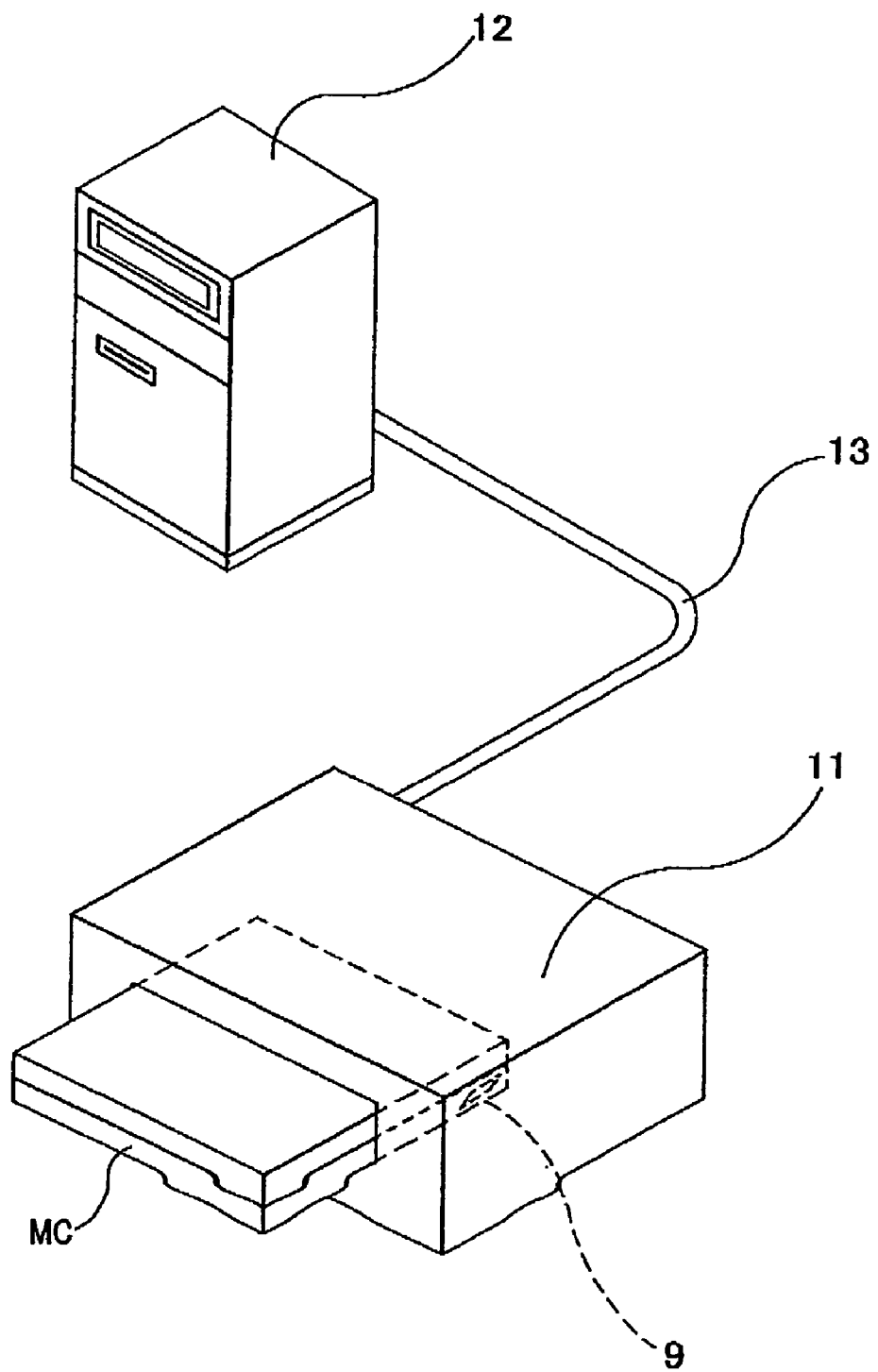
FIG. 5 is a perspective view showing the recording-and-reproducing device that performs recording/reproducing of the data on the magnetic tape cartridge.
Figure 6:
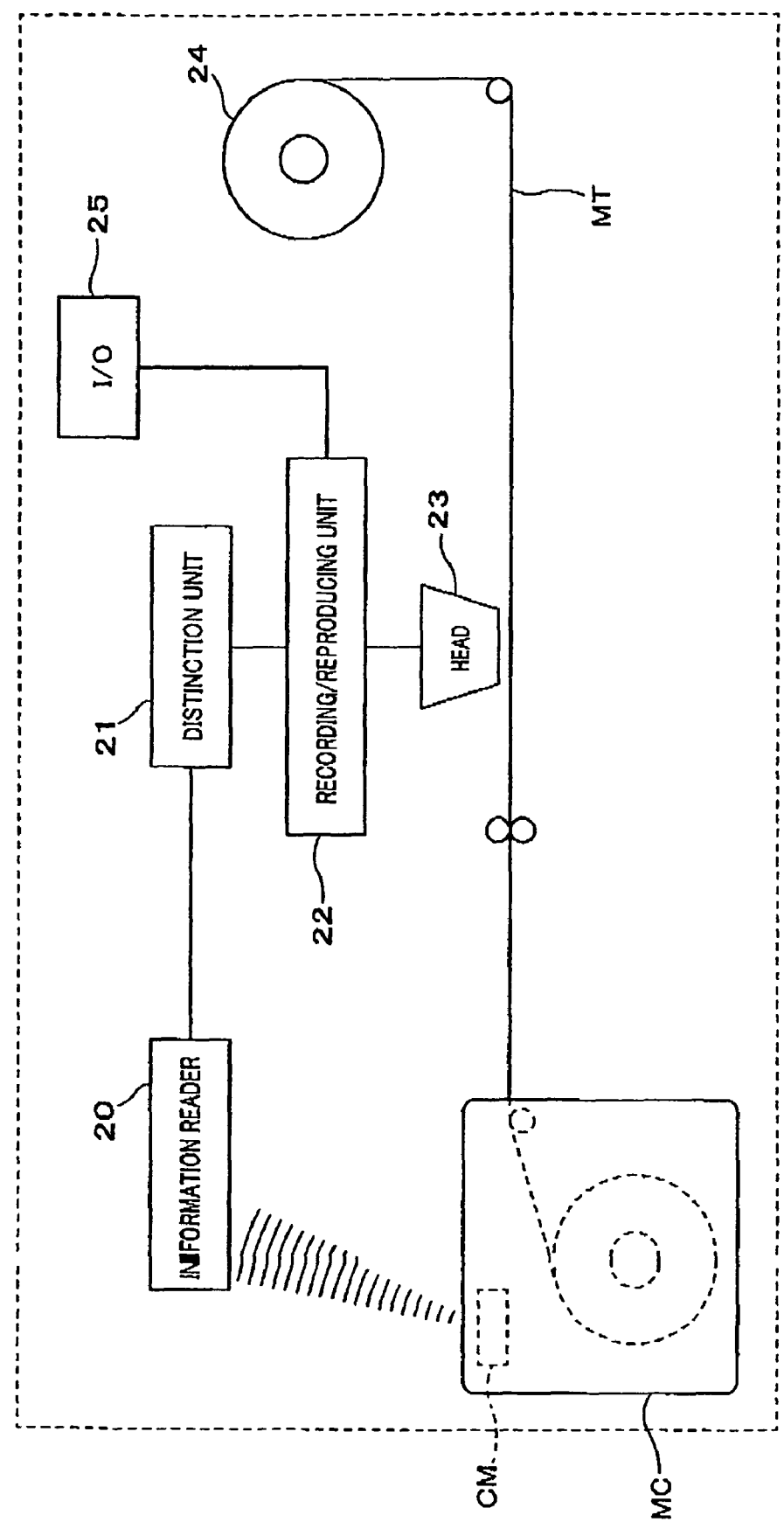
FIG. 6 is an explanatory view showing the construction of the recording-and-reproducing device

As shown in FIGS. 5 and 6, the recording-and-reproducing device 11 that performs the recording/reproducing of the data on/from the magnetic tape MT mainly includes a range information reader 20, a distinction unit 21, and a recording/reproducing unit 22, The range information reader 20 performs the readout of the management information from the cartridge memory CM stored in the magnetic tape cartridge MC. To be more precise, the range information reader 20 obtains the management information from the IC tip 9*c* of the cartridge memory CM in a contactless manner by utilizing an electromagnetic induction, and outputs the obtained management information to the distinction unit 21.

The distinction unit 21 obtains the identification information from the management information entered from the range information reader 20, and makes a distinction between the write-once area and the re-writable area. That is, which area (the write-once area and the re-writeable area) each section is belonging to, is checked by the distinction unit 21. Then, the distinction unit 21 outputs the result of the distinction to the recording/reproducing unit 22.

The recording/reproducing unit 22 performs the recording/reproducing of data on/from the magnetic tape MT. To explain it simply, the recording/reproducing unit 22 obtains data from the magnetic tape MT by a magnetic head 23 and outputs the obtained data to an external device, when the recording/reproducing unit 22 performs the reproducing of data is held in the magnetic tape MT. On the other hand, the recording/reproducing unit 22 refers to the distinction result entered from the distinction unit 21, and records data only on the re-writable area of the magnetic tape by the magnetic head 23, when the recording/reproducing unit 22 performs the recording of data on the magnetic tape MT.

Here, the recording-and-reproducing device 11 also includes a drive unit (not shown) which drives a reel 24 that reels up the magnetic tape MT supplies from the magnetic tape cartridge MC, an input/output interface (I/O) 25 which exchanges data to be recorded on/reproduced from the magnetic tape MT with the external device (the external computer 12) through a cable 13, and a power supply (not shown).

In the recording-and-reproducing device 11 having these constructions, the recording/reproducing of data on/from the magnetic tape MT is performed based on the identification information, when the magnetic tape cartridge MC is inserted to the inside of the recording-and-reproducing device 11.

In other words, the identification information (range information) is obtained from the cartridge memory by the range information reader 20. Next, the distinction between the write-once area and re-writable area of the magnetic tape MT is performed by the distinction unit 21. Then, the recording of data on the magnetic tape MT is performed based on the distinction result of the distinction unit 21 by the recording/reproducing unit 22.

Here, if the identification information that designates the whole area of the magnetic tape MT as re-writable is held in the cartridge memory 9, the recording-and-reproducing device 11 performs the recording of the data over the whole area of the magnetic tape MT.

Additionally, if the recording-and-reproducing device 11 cannot perform the readout of the identification information held in the cartridge memory 9 or if the recording-and-reproducing device 11 obtains the identification information that indicates whole regions of the magnetic tape MT is the write-once area, the recording-and-reproducing device 11 only performs the reproducing of the data.

In the present embodiment, as described above, the recording/reproducing of data is controlled based on the identification information that enables the distinction between the re-writable area and the write-once area. Thereby, the recording-and-reproducing device 11 can handle the magnetic tape cartridge MC adopting the magnetic tape MT, which has both the write-once area and the re-writable area.

[Motion of the Recording-and-Reproducing Device]

Figure 7:
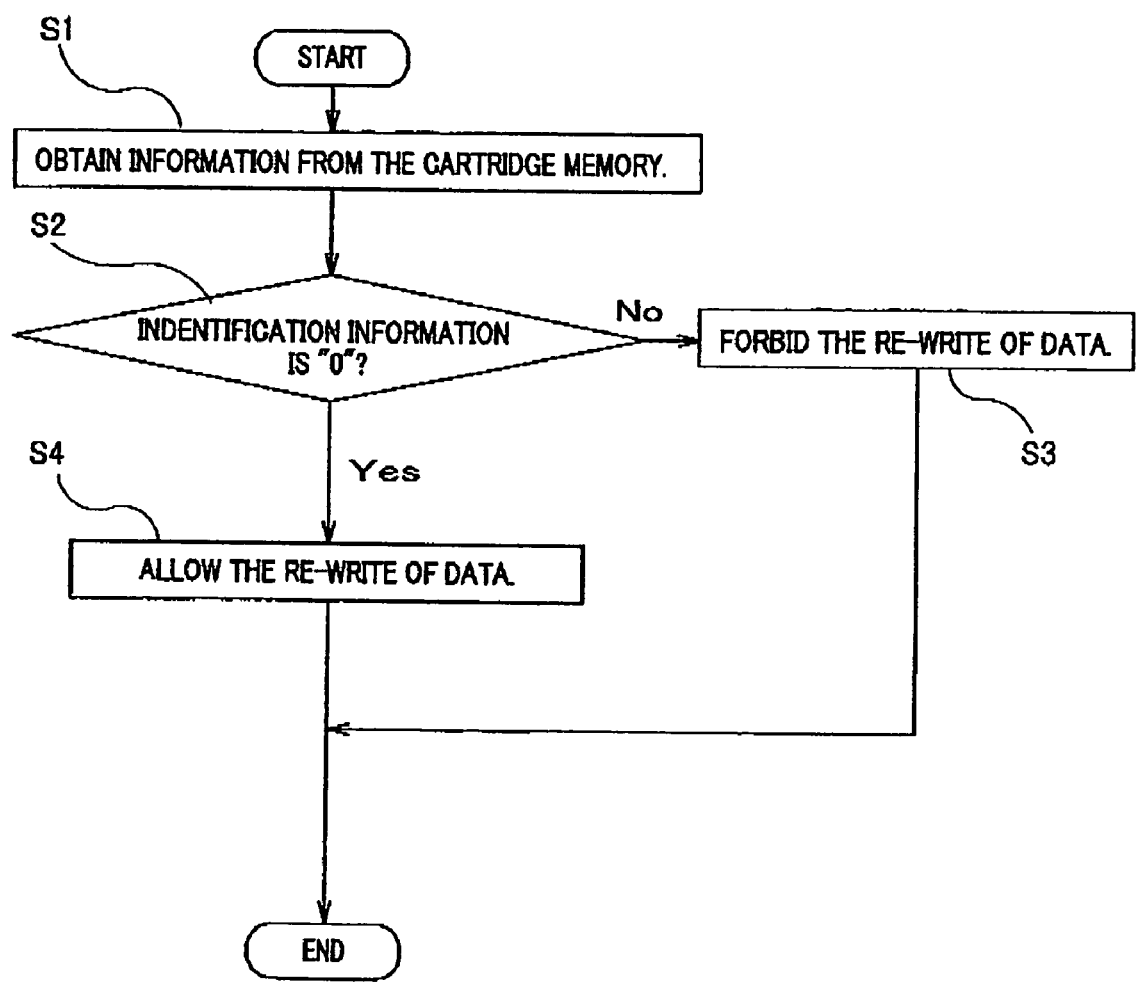
FIG. 7 is a flow chart explaining the motion of the recording-and-reproducing device.

Next, the motion of the recording-and-reproducing device 11 at the time of the recording/reproducing of the data on the magnetic tape MT will be explained with reference to the flow chart shown in FIG. 7.

First, the information reader 20 of the recording-and-reproducing device 11 performs the readout of the management information held in the cartridge memory 9 (S1), when the magnetic tape cartridge MC is inserted into the inside of the recording-and-reproducing device 11 (FIG. 5).

Then, the distinction unit 21 of the recording-and-reproducing device 11 obtains the address code and the identification information from the management information obtained by the information reader 20, and checks that which one of the re-writable area and the write-once area the specific region identified by the address code is belonging to. To be more precise, the distinction unit 21 checks whether or not the identification information corresponding to the address code is "0". When the identification information is not "0", the distinction unit 21 regards the area corresponding to the address code as the write-once area (S2). To be more 6 precise, the recording-and-reproducing device 11 regards the area, which is behind the point indicated by the address code, as the write-once area.

When the identification information is "0", the identification unit regards the area corresponding to the address code as the re-writable area (S4).

As described above, in the present embodiment, the recording-and-reproducing device 11 can handle the magnetic tape, which has both the re-writable area and the write-once is area, by controlling the recording-and-reproducing device 11 based on the information (identification information) held in the cartridge memory 9.

In the present invention, additionally, once some area of the magnetic tape MT is defined as write-once area, the content of the identification information regarding to the write-once area cannot be changed. In other words, in the present invention, once some area of the magnetic tape MT is defined as write-once area, these areas cannot be changed to the re-writeable area.

In the conventional magnetic tape MT, the information that enables the distinction between the re-writable area and the write-once area is recorded at the leader-part of the magnetic tape MT. Thus, the rewind of the magnetic tape MT and re-load of information are required in order to distinguish the re-writable area and the write-once area of the magnetic tape MT.

In the magnetic tape cartridge MC of the present embodiment, the information that enables the distinction between the re-writable area and the write-once area of the recording area of the magnetic tape MT is held in the cartridge memory 9.

Therefore, the magnetic tape cartridge MC according to the present embodiment can perform the distinction between the re-writable area and the write-once area of the magnetic tape MT, by performing the readout of the identification information held in the cartridge memory 9, Thus, the distinction between the re-writable area and the write-once area can be performed anytime.

In the present invention, the magnetic tape cartridge is used as an example of the recording media. But, the present invention's recording media is not limited to this. For example, mediums, such as a video tape, an optical recording media, and magnet optical disks can be adoptable as the recording media.

In the present embodiment, furthermore, the magnetic tape MT, in which write-once areas and re-writable areas are arranged in random order, is used. But, the magnetic tape MT, in which write-once areas are provided in group at the tape-head side and re-writable areas are positioned next to write-once areas in group, may be adoptable. In this case, the distinction between the write-once area and the re-writable area can be performed based on the identification information that indicates the boundary between the write-once area and the re-writable area.

Figure 8:
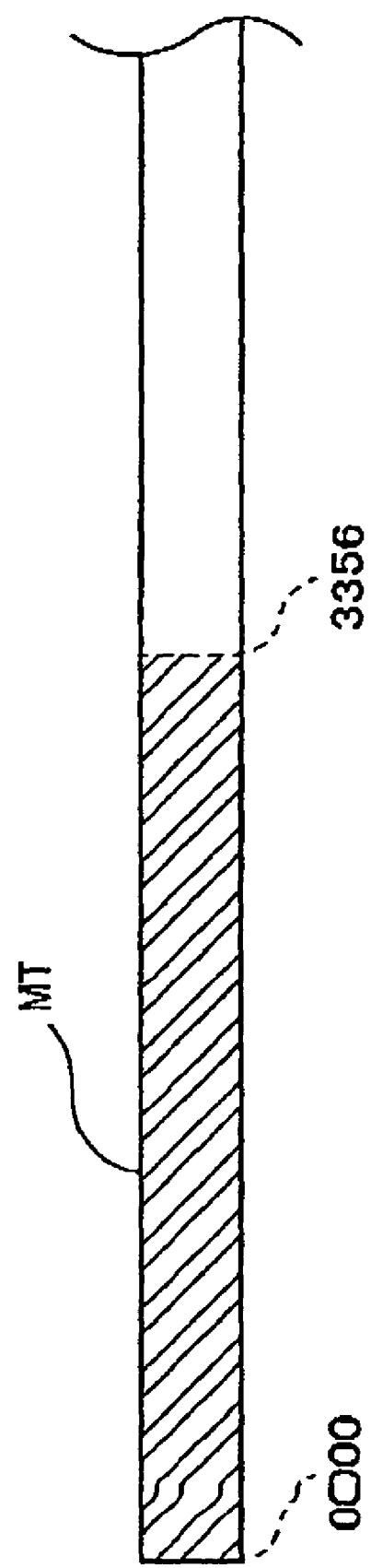
FIG. 8 is an explanatory view indicating the relation between the write-once region and the re-writable region on the magnetic tape.

To explain more concretely, as shown in FIG. 8, the identification information that indicates the boundary between the write-once area and the re-writable area is held in the cartridge memory 9. Thereby, it is clarified that the region between the point whose address code is 0000 (beginning of the magnetic tape MT) and the point whose address code is 3356 is the write-once area, and the region behind the point whose address code is 3356 is the re-writable area.

In this magnetic tape MT, additionally, the position of the boundary between the write-once area and the re-writable area may be movable. In this case, since the write-once area cannot be changed to the re-writable area once the region is established as the write-once area, the change of the point of the boundary is allowed only in the direction that widen the range of the write-once area. That is, the point of the boundary is moved in the rear direction with respect to the traveling direction of the magnetic tape MT.

Here, if the position of the boundary is movable, it is preferable that the recording-and-reproducing device 11 further includes an information protection unit (not shown) that checks the presence of important information in the re-writable area to be changed to the write-once area, and moves the important data to another re-writeable area when the important data is held in the re-writable area to be changed to the write-once area. This is because of the prevention of the erase of the important data.

In the present embodiment, if the recording medium cartridge, which stores a magnetic tape, in which a plurality of write areas and re-writable areas are lined up in random order, is used, the cartridge memory 9 may hold the information that indicates the address code with regard to the boundary between the write-once area and the re-writable area. To be more precise, the cartridge memory 9 may hold the information that indicates whether the position indicated by the address code is the end point or start point of the write-once area.

Figure 9:
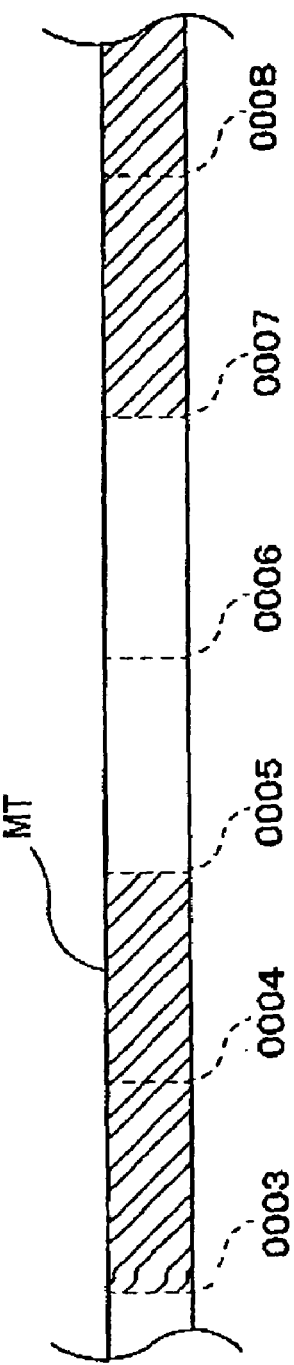
FIG. 9A is another example of the table showing the relation between the address code and the information code.
FIG. 9B is an explanatory view indicating the relation between the write-once region and the re-writable region on the magnetic tape.

As shown in FIG. 9A, for example, if the identification information is "0", it means that the position indicated by the address code is the start point of the write-once area. If the identification information is "1", it means that the position indicated by the address code is the end point of the write-once area.

That is, in the case of FIG. 9B, it is clarified that the region between the point whose address code is 0003 and the point whose address code is 0005 is re-writable area, that the region between the point whose address code is 0005 and the point whose address code is 0007 is write-once area, and that the region between the point whose address code is 0007 and the point whose address code is 0018 is re-writable area.

Thus, if the position wherein the data will be recorded is within the write-once area (the region between the start point and the end point) the recording of the data is forbidden.

If the position wherein the data will be recorded is within the re-writable area (the region between the end point and the start point), the recording of the data is allowed.

In this magnetic tape MT, additionally, the position of the boundary between the write-once area and the re-writable area may be movable. In this case, since the write-once area cannot be changed to the re-writable area once the region is established as the write-once area, the change of the point of the boundary is allowed only in the direction that widen the range of the write-once area.

In this case, the start point of the write-once area is allowed to move in the fore direction with respect to the traveling direction of the magnetic tape MT, and the end point of the write-once area is allowed to move in the rear direction with respect to the traveling direction of the magnetic tape MT.

That is, the address code of the end point of write-once area is movable only in the direction which increases the number of the address code. And the address code of the start point of write-once area is movable only in the direction which decreases the number of the address code.

For example, if the address code of the start point of the write-once area is 0005, the number of the address code of the start point may be changed to the numbers of 0004, 0003, 0002, and so on.

Here, if the position of the boundary is movable, it is preferable that the recording-and-reproducing device 11 further includes an information protection unit (not shown) that checks the presence of important information in the re-writable area to be changed to the write-once area, and moves the important data to another re-writeable area when the important data is held in the re-writable area to be changed to the write-once area. This is because of the prevention of the erase of the important data.

As described above, in the present embodiment, the identification number that is used for distinguishing the write-once area and the re-writable area is "0" and "1". But, the identification number is not limited to this. Various types of the identification numbers can be adoptable instead of "0" and "1". For example, the number symbols and the symbols may by adoptable Although there have been disclosed what are the patent embodiment of the invention, it will be understood by person skilled in the art that variations and modifications may be made thereto without departing from the scope of the invention is indicated by the appended claims.

What is claimed is:

1. A recording-medium cartridge that includes a recording medium and a cartridge memory,
    wherein the recording medium includes a write-once area, in which the re-write of data is forbidden, and a re-writable area, in which the re-write of data is allowed,
    the cartridge memory holds range information that shows the range of the write-once area on the recording medium,
    a recording area of the recording medium is divided into a plurality of continuous sections, and each boundary region between adjoining sections is assigned with a unique identification number, and
    the cartridge memory holds identification information, the identification information indicating that the section behind the boundary region identified by the unique identification number is either one of the write-once area and the re-writable area.

2. A recording-medium cartridge according to claim 1, wherein
    a plurality of write-once areas and re-writable areas are lined up on the recording-medium, and wherein
    the cartridge memory holds information showing a position of a boundary between the write-once area and the re-writable area.

3. A recording-medium cartridge according to claim 1, wherein
    the range information includes
    address information, showing a position of a boundary between the write-once area and the re-writable area, and
    detail information showing that which of a start point of the write-once area and an end point of the write-once area corresponds to the position identified by address information.

4. A recording-medium cartridge according to claim 1, wherein
    the recording medium is a magnetic tape.

5. A recording-medium cartridge according to claim 2, wherein
    the recording medium is a magnetic tape.

6. A recording-medium cartridge according to claim 3, wherein
    the recording medium is a magnetic tape.

7. A recording-medium cartridge according to claim 1, wherein
    the recording medium is a magnetic disk.

8. A recording-medium cartridge according to claim 2, wherein
    the recording medium is a magnetic disk.

9. A recording-medium cartridge according to claim 3, wherein
the recording medium is a magnetic disk.

10. A recording-medium cartridge according to claim 1, wherein
the recording medium is a optical tape.

11. A recording-medium cartridge according to claim 2, wherein
the recording medium is a optical tape.

12. A recording-medium cartridge according to claim 1, wherein
the recording medium is a optical disk.

13. A recording-medium cartridge according to claim 2, wherein
the recording medium is a optical disk.

14. A recording-and-reproducing device for performing the recording/reproducing of a data on/from the recording-medium cartridge of claim 1, the recording-and-reproducing device comprising:

a range information reader, which performs a readout of the range information;

a distinction unit, which performs the distinction between the write-once area and re-writable area of the recording medium based on the range information; and a recording/reproducing unit, which performs the recording/reproducing of data on/from the recording medium, wherein the recording/reproducing unit performs the recording of data only on the re-writable area by referring to the distinction result of the distinction unit.

15. The recording-and-reproducing device according to claim 14, wherein the distinction unit regards whole area of the recording medium as the write-once area, when the range information reader can not perform the readout of the range information from the cartridge memory.

* * * * *